US006895149B1

(12) United States Patent
Jacob et al.

(10) Patent No.: US 6,895,149 B1
(45) Date of Patent: May 17, 2005

(54) APPARATUS FOR BEAM HOMOGENIZATION AND SPECKLE REDUCTION

(76) Inventors: James Jeffery Jacob, 605 Sand Dollar Dr., La Selva Beach, CA (US) 95076; Timothy Litvin, 790 Mariner Park Way, #3, Santa Cruz, CA (US) 95062; Andrew John Merriam, P.O. Box 418, Soquel, CA (US) 95073

( * ) Notice: Subject to any disclaimer, the term of this patent is extended or adjusted under 35 U.S.C. 154(b) by 166 days.

(21) Appl. No.: 10/438,162

(22) Filed: May 13, 2003

Related U.S. Application Data

(60) Provisional application No. 60/380,556, filed on May 13, 2002.

(51) Int. Cl.[7] ............................ G02B 6/04; G01N 21/01
(52) U.S. Cl. .................... 385/102; 385/109; 356/237.2; 356/479
(58) Field of Search ................................ 385/100–114; 356/237.1–237.6, 479

(56) References Cited

U.S. PATENT DOCUMENTS 5,029,975 A * 7/1991 Pease ......................... 385/120
5,862,285 A * 1/1999 Danielian et al. ............ 385/121
6,347,173 B1 * 2/2002 Suganuma et al. .......... 385/115
6,369,888 B1 * 4/2002 Karpol et al. ............ 356/237.5

* cited by examiner

Primary Examiner—Akm Enayet Ullah
Assistant Examiner—Jerry T. Rahll

(57) ABSTRACT

This invention greatly improves the quality of images obtained using optical systems illuminated by coherent light. It does so by removing the undesirable psuedo-random variations in the final image due to interference speckle and inhomogeneities in the spatial intensity distribution of the light source. A bundle of light-guiding fibers is interposed between the illumination source and the imaging system. Non-uniform propagation within the fiber bundle creates a psuedo-random phase variation across the illumination beam, which gives rise to a dynamic interference speckle pattern superimposed upon the desired image acquired by the optical system. Rotating the fiber bundle around the axis of propagation, whilst simultaneously integrating the output of the photosensitive detector over a period of time, substantially removes variations due to source inhomogeneities and coherent interference.

10 Claims, 4 Drawing Sheets

APPARATUS FOR BEAM HOMOGENIZATION AND SPECKLE REDUCTION

CROSS-REFERENCE TO RELATED APPLICATION

This application claims the benefit of U.S. Provisional Patent Application Ser. No. 60/380,556, "Laser speckle reducer" by J. J. Jacob and T. Litvin, filed May 13, 2002, which is incorporated herein by reference.

BACKGROUND OF THE INVENTION

Lasers and other coherent light sources are attractive illumination sources for optical microscopes and other image-forming systems due to their high brightness and monochromaticity. However, there are two primary limitations to the use of such sources which must be overcome if high-quality images are to be obtained. First, the images derived from systems illuminated with spatially and temporally coherent radiation often exhibit a psuedo-random interference pattern of light and dark regions across the entire field of view. This interference pattern is known as speckle and is due to the interference of the coherent light scattered from different points on the object. The speckle pattern is highly undesirable if quantitative information is required from the images, e.g., transmission measurements of a partially opaque object.

Further, the beams derived directly from laser sources often exhibit a spatial intensity distribution which is substantially non-uniform. For example, many laser systems are characterized by a Gaussian-shaped intensity distribution. High-quality images generally require a homogenized, uniformized illumination source, i.e., a circular, "flat-top" intensity distribution. Often, these beams have additional small-scale intensity structure due to dust spots on mirrors, &c., which would mar the quality of the final image if not removed or compensated.

Many means have been proposed to homogenize the spatial intensity distribution and/or reduce the speckle contrast. Speckle reduction techniques generally fall into two categories: reduction of illumination source spatio-temporal coherence, or time-averaging of dynamic speckle patterns. Occasionally, the methods used to reduce the speckle also act to homogenize the spatial intensity distribution. The first approach to speckle reduction reduces the optical coherence of the illumination source to the point that there is insufficient interference to produce visible speckle patterns. The second approach actually takes advantage of the coherence properties to produce speckle patterns which vary in time and which may be combined via temporal integration and/or averaging until the speckle contrast is reduced to an acceptable level. To a large extent, the choice of homogenization and speckle reduction technique depend on the exact parameters of the illumination source itself, including power levels, wavelength, and repetition rate.

A setup popular in semiconductor optical lithography to improve beam homogeneity with low-coherence sources has been a fixed length of transparent solid rod [see K. Jain, *Excimer Laser Lithography*, SPIE Press, Bellingham, Wash., 1990: pg. 114]. Light enters one side of the rod at a variety of angles, and then propagates through to the other side via a number of total-internal-reflection (TIR) bounces. This setup effectively removes any intensity variations from the incident beam. Additionally, the path length of each ray depends upon the incidence angle and exact shape of the rod, so that the phase profile is also scrambled. A natural extension of this approach has been the use of a single, fixed, multi-mode optical fiber, through which the illumination light propagates. Both apparatus are suitable only for already low-coherence sources.

Elimination of the optical coherence is an attractive choice because no temporal averaging is required, hence throughput is increased, but is often prohibitively difficult. One manner in which the spatial coherence may be reduced is to divide the output of the illumination source into several portions, each of which is made to travel a slightly different path length to the imaging plane of the microscope. If the difference in path lengths between these separated portions is on the order of, or greater than, the coherence length of the source, then upon recombination of the separated portions, the light will seem to originate from a number of separate sources with no fixed phase relationship. The division into multiple 'independent' sources also can provide homogenization of the spatial mode of the illumination radiation if each of the beams passes through different aberrating media. The degree of improvement in the final images depends upon the number of 'independent' sources that are created. The optical arrangement to perform this operation using discrete optical components is quite bulky and suffers from low overall throughput, and is not suitable for long-coherence length sources, e.g., single-frequency lasers.

Consider now the second approach to speckle reduction, that of averaging dynamic speckle patterns. This approach is suitable for high-coherence sources such as single-frequency lasers. If the phase profile of the illumination beam can4 be altered dynamically without destroying the coherence, then although individual snapshots taken by the imaging system may exhibit high-contrast speckle patterns, an integrated image of several randomly-oriented speckle patterns will appear smooth. Perhaps the simplest setup historically has been a single or double set of ground-glass diffusers inserted into the illumination beam path. The surface of these diffusers, on the scale of an optical wavelength, is a random hilly pattern due to the random process of grinding. Thus, different points on the diffuser are of slightly different thicknesses, and different rays travelling through different regions of the diffuser will pick up psuedo-random phase shifts relative to one another. (However, since the size of these small hills is much less than the coherence length of the source, the phase profile is still coherent.) The randomized phase profile subsequently creates a dynamic, high-contrast speckle pattern in the image plane of the optical system which is recorded along with the desired test sample image. Additionally, the rough surface efficiently scatters the incident illumination light into a broad range of angles, so that each illumination point consists of contributions from many points on the incident illumination beam. Thus both requirements, i.e. spatial beam homogenization and the creation of a dynamic speckle pattern, are met. The disadvantage of this method is that the diffusers (since they scatter light so effectively) are extremely lossy; often less than $\frac{1}{1000}^{th}$ of the available illumination light is available for actual imaging. This problem precludes use of the diffuser technique at difficult-to-produce illumination wavelengths, especially in the vacuum ultraviolet (VUV).

SUMMARY OF THE INVENTION

This invention greatly improves the quality of images obtained using optical systems illuminated by coherent light. It does so by removing the undesirable psuedo-random variations in the final image due to interference speckle and inhomogeneities in the spatial intensity distribution of the light source. A special device, composed of a bundle of light-guiding fibers, is interposed between the illumination source and the imaging system. Each fiber is of slightly different length due to imperfections in manufacturing or deliberately introduced variations. These length differences are in general less than the coherence length of the illumination source, so that the light at the end of the bundle remains coherent. Each end of the fiber may in addition be arranged at different positions in the entrance and exit faces of the bundle to assist in homogenizing the intensity distribution. The incident illumination rays are distributed among the different fibers and propagate through the bundle along slightly different paths, depending upon the incidence angle and the position within the bundle. Each ray has thus accumulated a slightly different optical phase when it exits the device. This non-uniform propagation creates a psuedo-random phase variation across the illumination beam, which gives rise to an interference speckle pattern superimposed upon the desired image acquired by the optical system. This combination image is recorded by a detector, which may be a camera, or the human eye, or similar photo-sensitive device. The speckle pattern, although it initially appears random, is in fact a deterministic function of several factors, including fiber bundle position and orientation: if the fiber bundle is rotated in either direction, the speckle pattern changes, hence the description 'dynamic'. This property is manipulated in order to remove the speckle. Rotating the fiber bundle around the axis of propagation, whilst simultaneously integrating the output of the photosensitive detector over a period of time thus washes out unwanted variations due to source inhomogeneities and coherent interference ('speckle'). In general, longer integration times provide higher degrees of image speckle reduction. Note that any method which varies the propagation within the fiber bundle will have a similar smoothing effect on the interference speckle; for example, the fiber bundle could be translated perpendicularly to the beam direction. The fiber bundles are compact, scatter much less light than alternate techniques, and can be adapted for any wavelength of interest. The fiber bundles may be composed of solid-core fibers, for operation in the visible and near-IR and near-UV, or of hollow-core 'capillary' fibers for use in the far-IR and VUV regions of the spectrum. These techniques are especially useful for the design of short-wavelength (<200 nm) high-resolution laser microscopes.

OBJECTS OF THE INVENTION

It is a primary object of this invention to describe a method for speckle reduction appropriate for high-coherence, short-wavelength illumination sources.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE INVENTION

Figure 3:
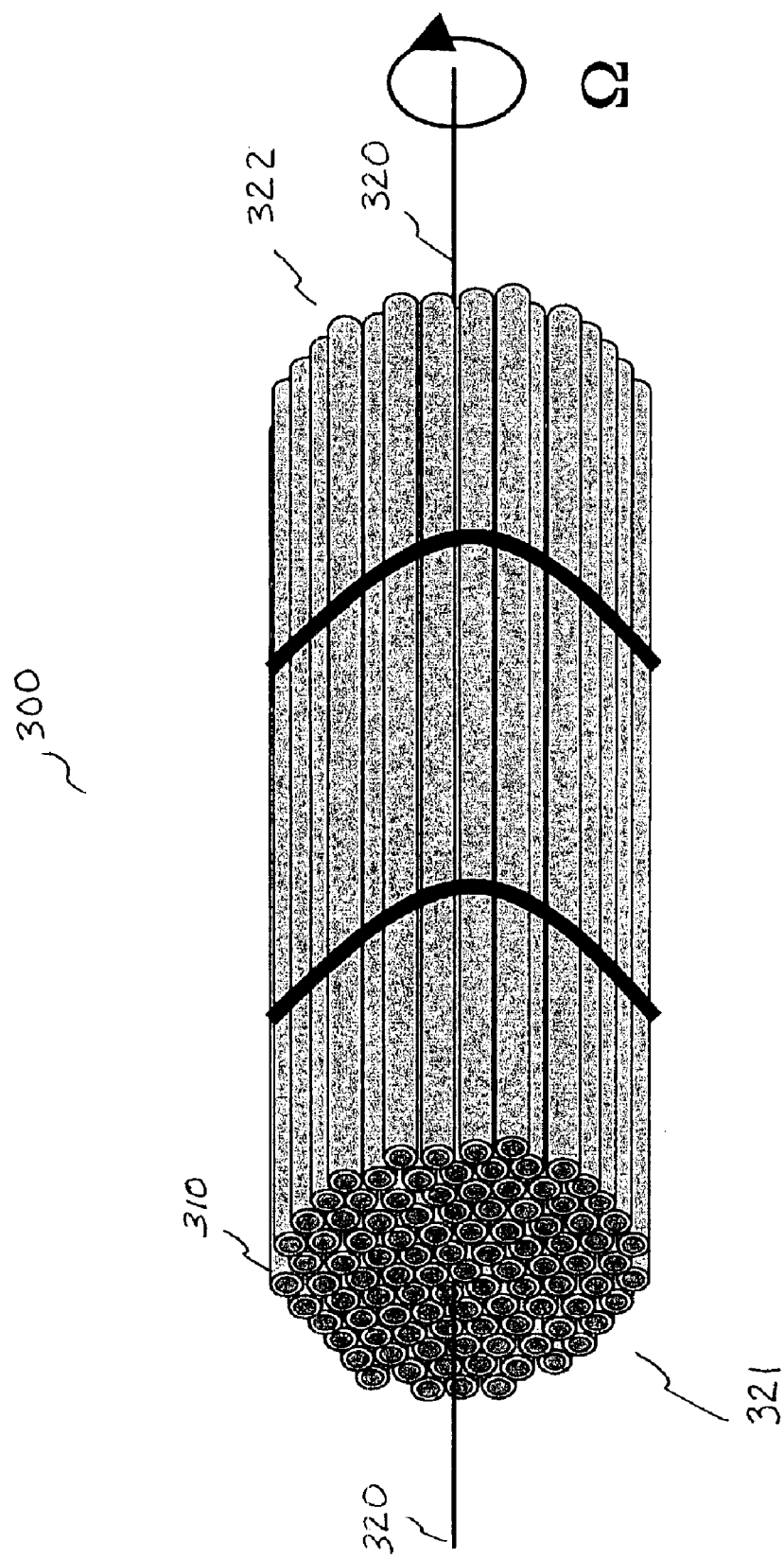
FIG. 3 Schematic diagram of a fiber bundle.

The present invention combines the steps of temporal averaging and dynamic speckle pattern generation to accomplish spatial homogenization and speckle reduction. Our technique for division and re-combination uses an array or bundle 300 of light guides 310, as shown in FIG. 3. The array may be arranged so that the exit 322 and entrance 321 faces have different geometries to accomplish beam shaping (e.g., from rectangular to circular). To the imaging system, the illumination now seems to arise from a number (often several hundred) of partially-coherent, small circular apertures. Propagation through the light guide array homogenizes the beam and reduces the coherence of the laser light. A collection of fibers (either optical or capillary tube) is fused together, the number depending upon the desired aperture and core diameter. The whole assembly may be rotated along the axis of optical propagation 320 in either direction at some rotation rate $\Omega$, or translated across the face perpendicular to the axis of propagation 320. The embodiment 300 shows straight light guides 310, but to assist in beam homogenization these guides could instead be interwoven in some fashion so that light guides at points on the entrance face 321 map to different points on the exit face 322.

Figure 1:
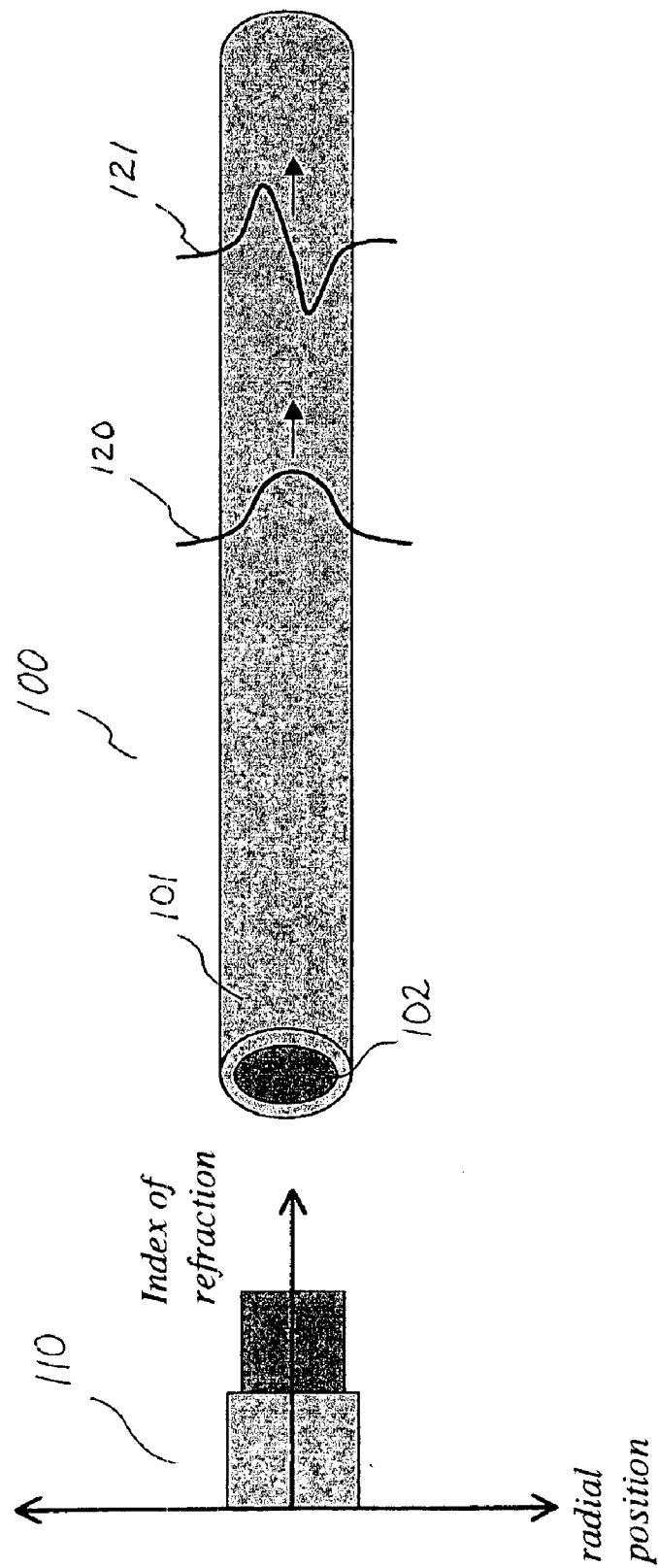
FIG. 1 Schematic diagram of a single optical fiber, composed of a solid core (typically fused silica) and a cladding.
Figure 2:
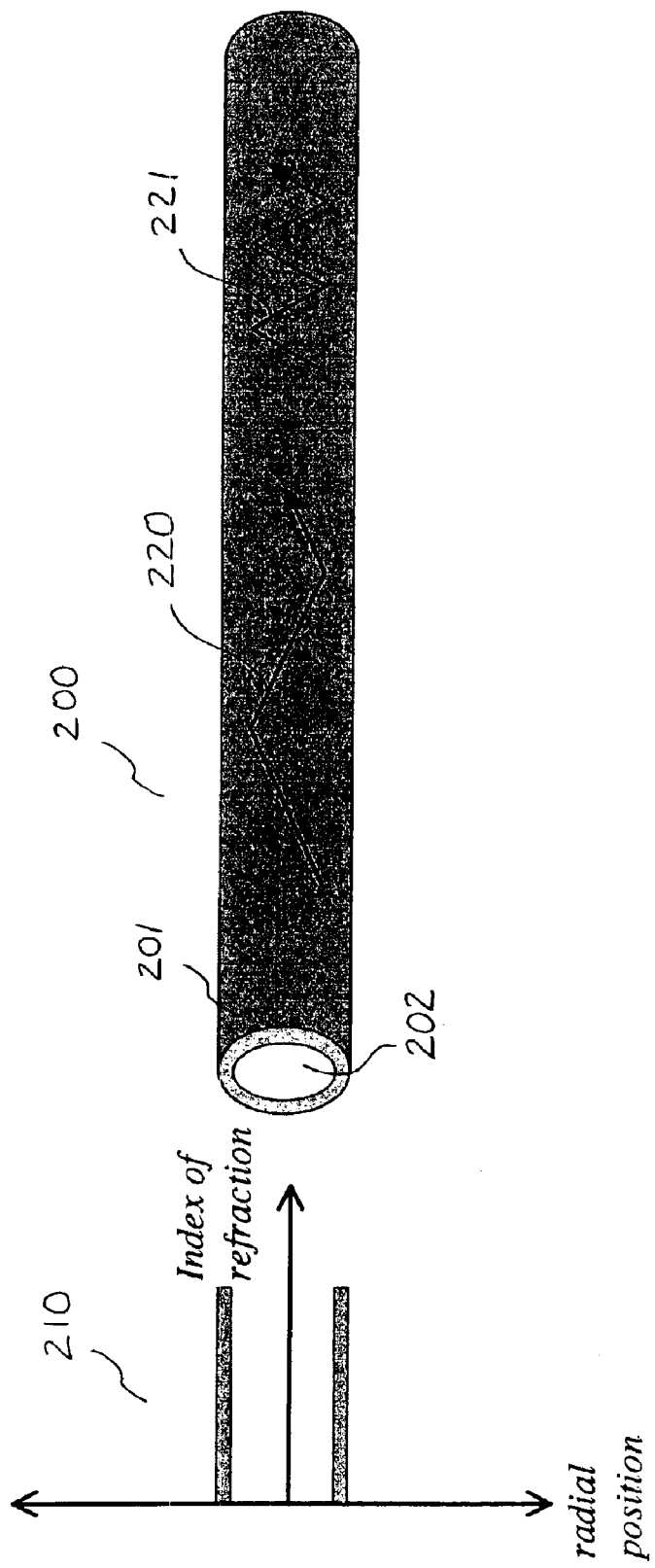
FIG. 2 Schematic diagram of a single 'hollow-core' capillary tube-type fiber, composed of a guide wall (typically fused silica) surrounding a hollow core region.

There are two general types of light guides which can be used to create the fiber bundle: solid-core and hollow-core (capillary tube) optical fibers. In the traditional fibers used in optical fiber communications applications, consisting of a solid core 102 and surrounding cladding material 101, the index of refraction 110 is larger inside the core 102 than out, giving rise to true low-loss waveguiding over a broad range of wavelengths. Typical core diameters 102 are 62.5 microns and higher for multimode operation; different spatial modes 120, 121 propagate with slightly different average indices of refraction, giving rise to slight differences in path lengths. A second type of light-guiding fiber, a hollow core capillary tube 200, is shown in FIG. 2. Light is weakly guided (with some attenuation) via shallow-angle reflections from the higher-index guide walls 201. The cores 202 may be evacuated, or filled with gasses or liquids to enhance certain effects. (In FIG. 2, the index of refraction 210 shows equal values inside and outside the core 202, illustrative of operation in, e.g., air.) Additionally, the inner wall of the guide walls 201 may be coated with metallic or other substances to further modify the guiding properties. Rays 220, 221 with different incidence angles propagate for different path lengths, giving rise to a variation in optical phase upon exit from the guide. Light propagates predominantly within the hollow regions of these light guides, so that absorption of short-wavelength laser light is avoided. This technique is thus suitable for arbitrarily short wavelengths. The incident laser beam impinges upon the front surface 321 of the array, and is roughly equally distributed between the capillaries.

As a demonstration of the dramatic improvements to image quality that may be obtained using this invention, we have constructed a fused fiber bundle and implemented speckle reduction in a high-resolution optical microscope. Microscope illumination is provided by an ultraviolet (UV) laser beam with a wavelength of 193.4 nm and a spectral bandwidth of 10 pm, produced by a solid-state non-linear optical processs that originates from a Q-switched Nd:YAG laser system. Characteristic of a frequency up-conversion process, the UV beam is spatially non-uniform, but is highly spatially coherent. This UV beam propagates through the fused fiber optic bundle, which consists of approximately one hundred solid-core optical fibers fused together and is encased in an aluminum ferrule three inches long. The fiber bundle is approximately ⅛" diameter and the fibers within the ferrule are stranded randomly to form a homogenized output beam. A collimating lens collects the light diverging from the exit face of the bundle and relays the light to the microscope.

The laser beam is directed through a condenser lens underneath the sample stage and the transmitted light is collected by the objective lens, which images the patterned surface onto a CCD camera. The CCD camera integrates the contributions of many laser shots (typically 10 to 50). The image provided by this arrangement with a static (non-rotating) fiber bundle exhibits a high degree of speckle, since the light still has a degree of spatio-temporal coherence. (This is because only the phase profile of the illumination light has been changed; the coherence of the source has not been eliminated.) However, each orientation of the fiber bundle gives rise to a slightly different speckle pattern, and if the fiber bundle is rotated around the axis of optical propagation during image acquisition, the contrast of the speckle pattern is substantially reduced.

Figure 4:
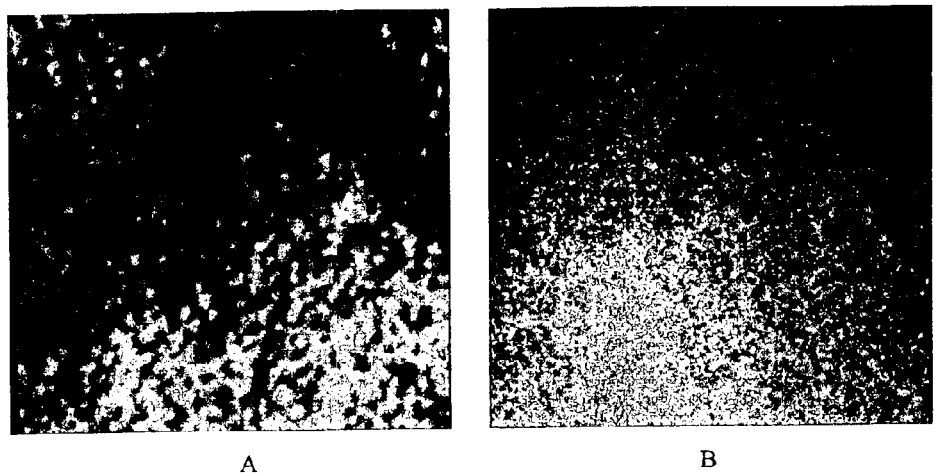
FIG. 4 Example images from a high-resolution short-wavelength optical microscope demonstrating the improvement in image spatial intensity uniformity.
Figure 4:
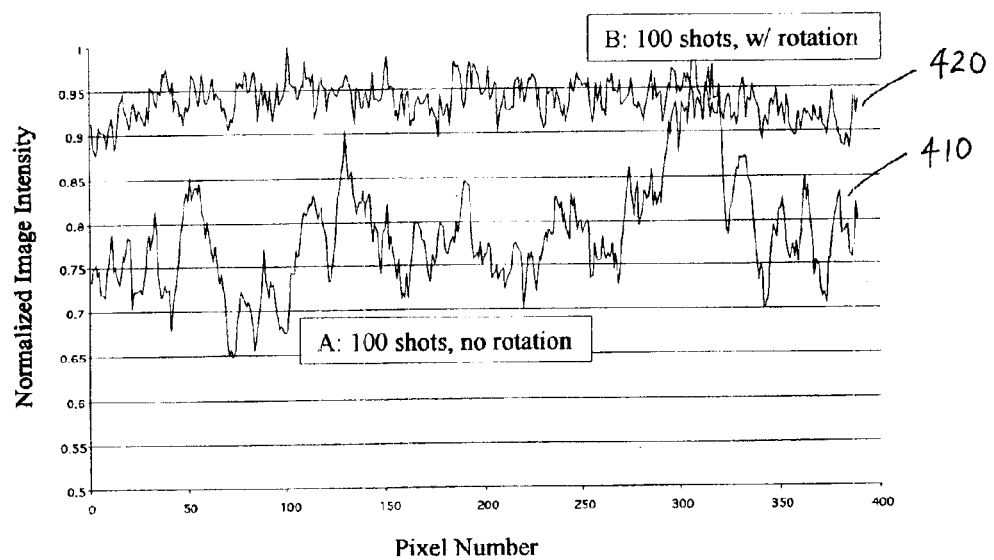

Typical images showing image spatial uniformity improvements using the apparatus of this Invention are shown in FIG. 4A and FIG. 4B. The same region of a clear (100% transmitting) object is imaged for one hundred laser shots using the laser microscope described above. In the first case, FIG. 4A shows the image when the laser radiation propagates directly to the microscope consdensor, i.e., without speckle reduction or homogenization. A densitometer trace from the center of this CCD image 410 shows large fluctuations of intensity on both large and small scales. Typically, the long-range fluctuations (at lower spatial frequencies) are due to the inhomogeneities in the laser source itself, whereas the shorter-range fluctuations (at higher spatial frequencies) are due to interference speckle of the 1-mm coherence-length 193.4 nm radiation. Conversely, if the laser radiation propagates through the rotating fused fiber bundle, and the image is made using the same number of laser shots and of the same clear object, dramatic improvements to both the image FIG. 4B and the intensity uniformity 420 are evident. Both long-range and short-range intensity fluctuations have been reduced.

It will be clear to a person skilled in the art that the above description points out only one of many possible embodiments. These embodiments and the teaching contained in the specifications will enable one to reduce the speckle and image non-uniformity that occur in many configurations and arrangements of coherently-illuminated optical systems. Accordingly, the scope of the invention should be determined by the following claims and their legal equivalents.

What is claimed is:

1. An apparatus for coherent beam homogenization and speckle reduction, consisting of:

an array of light guides arranged in a given shape;

wherein said array is disposed to receive and guide light from a light source to an optical system; and wherein said array is rotated around the axis of optical propagation during image signal acquisition.

2. The apparatus of claim 1 wherein said light guide array is composed of solid-core fibers.

3. The apparatus of claim 1 wherein said light guide array is composed of hollow-core capillary tubes.

4. The apparatus of claim 1 wherein said light guide array is composed of a combination of solid-core fibers and hollow-core capillary tubes.

5. The apparatus of claim 1 wherein said array is composed of two or more discrete sub-arrays, arranged in a sequential fashion, each of which may be independently manipulated.

6. An apparatus for coherent beam homogenization and speckle reduction, consisting of:

an array of light guides arranged in a given shape;

wherein said array is disposed to receive and guide light from a light source to an optical system; and wherein said array is translated in a plane perpendicular to the direction of propagation during image signal acquisition.

7. The apparatus of claim 6 wherein said light guide array is composed of solid-core fibers.

8. The apparatus of claim 6 wherein said light guide array is composed of hollow-core capillary tubes.

9. The apparatus of claim 6 wherein said light guide array is composed of a combination of solid-core fibers and hollow-core capillary tubes.

10. The apparatus of claim 6 wherein said array is composed of two or more discrete sub-arrays, arranged in a sequential fashion, each of which may be independently manipulated.

* * * * *